United States Patent [19]

Engström

[11] Patent Number: 4,699,068

[45] Date of Patent: Oct. 13, 1987

[54] APPARATUS FOR SEPARATING SOLIDS FROM FLUE GASES IN A CIRCULATING FLUIDIZED BED REACTOR

[75] Inventor: Folke Engström, San Diego, Calif.

[73] Assignee: A. Ahlstrom Corporation, Karhula, Finland

[21] Appl. No.: 916,485

[22] PCT Filed: Jan. 23, 1986

[86] PCT No.: PCT/FI86/00008

§ 371 Date: Sep. 22, 1986

§ 102(e) Date: Sep. 22, 1986

[87] PCT Pub. No.: WO86/04403

PCT Pub. Date: Jul. 31, 1986

Related U.S. Application Data

[63] Continuation-in-part of Ser. No. 734,716, May 16, 1985, Pat. No. 4,672,918.

[30] Foreign Application Priority Data

Jan. 29, 1985 [FI] Finland ................................ 850373

[51] Int. Cl.[4] .............................................. F23J 2/00
[52] U.S. Cl. ...................................... 110/216; 55/484; 110/245; 122/4 D; 406/173

[58] Field of Search ................... 110/216, 245; 55/484; 122/4 D; 406/173

[56] References Cited

U.S. PATENT DOCUMENTS 3,435,598  4/1969  Coulter et al. .
3,897,228  7/1975  Berz .................................. 55/484 X
4,165,717  8/1979  Reh et al. ............................ 122/4 D

FOREIGN PATENT DOCUMENTS 879144  2/1980  U.S.S.R. .

Primary Examiner—Edward G. Favor
Attorney, Agent, or Firm—Nixon & Vanderhye

[57] ABSTRACT

The invention comprises an apparatus for separating solids from flue gases in a circulating fluidized bed reactor having a horizontal cyclone separator, the gas inlet channel of which is connected to the upper part of the reactor, a return channel of the solids to the lower part of the reactor, and a gas outlet to a convection part of the reactor. In order to accomplish a compact construction, there is a plurality of coaxial turbulence chambers in the cyclone separator, the opposite walls of which form gas outlet channels between the turbulence channels.

7 Claims, 3 Drawing Figures

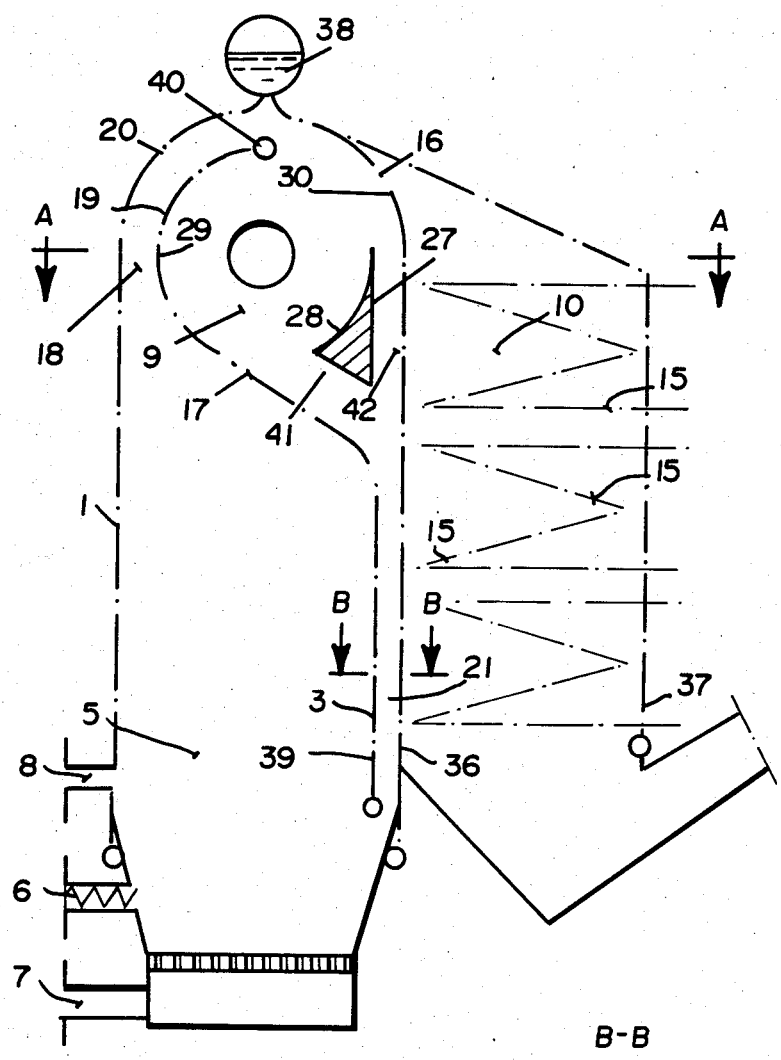
FIG. 1
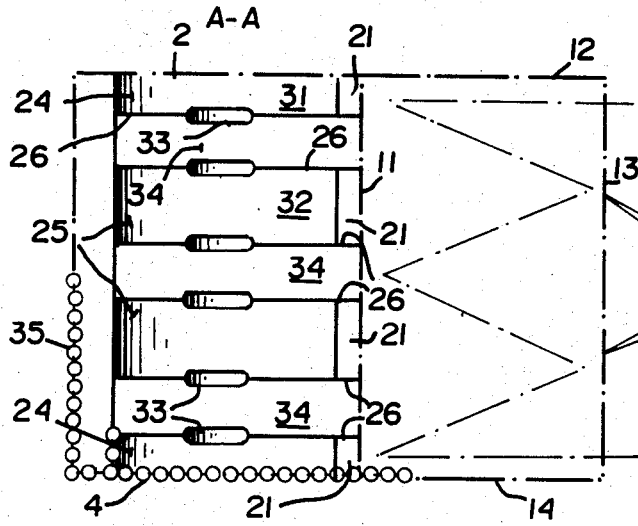
FIG. 2
FIG. 3

APPARATUS FOR SEPARATING SOLIDS FROM FLUE GASES IN A CIRCULATING FLUIDIZED BED REACTOR

This application is a continuation-in-part of application Ser. No. 734,716 filed May 16, 1985, now U.S. Pat. No. 4,672,918.

The present invention relates to an apparatus for separating solids from flue gases in a circulating fluidized bed reactor having a horizontal cyclone separator, the gas inlet channel of which is connected to the upper part of the reactor, a return channel for solids to the lower part of the reactor, and a gas outlet channel to a convection part of the reactor.

The object of the invention is to accomplish a separator to be used with circulating fluidized bed reactors with which separator the solids in the flue gases can effectively be separated and a space saving construction accomplished.

The circulating fluidized bed technique has long been applied e.g. in calcinators and is nowadays applied to a growing extent in various reactors, such as boilers and gasifiers. In known applications, the separation of solids from flue gases takes place in an ordinary, in its lower part funnel-shaped cyclone separator, in the cylindrical turbulence chamber of which is disposed a gas outlet pipe that leads the gases upwards, and from which solids are returned to the reactor via a discharge pipe.

In large circulating fluidized bed reactors several separators are usually used which makes the gas channel system complicated and requires several expansion joints.

The present invention provides a solution which avoids the above mentioned problems.

The apparatus according to the invention is mainly characterized in that there is a plurality of parallel turbulence chambers in the horizontal cyclone separator, between the opposite end walls of which are formed gas outlet channels.

In one embodiment of the invention there is a gas outlet in the opposite end walls of the parallel turbulence chambers, i.e. gas is discharged through the both end walls in each turbulence chamber, possibly with the exception of the turbulence chambers at the both ends of the device. For that reason the outlets are small which again makes it possible to diminish the diameter of the turbulence chambers.

Because there are several similar, parts having plane surfaces in the device according to the invention it is easy to manufacture. The solution is also space and material saving.

The invention will be described in detail in the following with reference to the accompanying drawing in which FIG. 1 shows a vertical section of one embodiment of the invention, FIG. 2 shows a section along the line A—A in FIG. 1. and FIG. 3 shows a section along the line B—B in FIG. 1.

The steam boiler shown in the figure comprises a combustion chamber 5 defined by four walls 1–4 formed by tubes that have been welded together in a way known per se. The tubes form heat transfer surfaces of the boiler and they have been connected to the boiler circulation system in a way that has not been described in detail.

A fuel inlet channel 6 is located in the lower part of the combustion chamber. There are also inlet channels 7 and 8 for primary gas and secondary gas respectively.

A horizontal cyclone separator 9 is located on top of the combustion chamber. Beside the combustion chamber is situated a vertical convection part 10 which is defined by tube walls 11–14 and in which heat transfer surfaces 15 additionally have been disposed.

Front and back walls 1, 3 of the combustion chamber and a wall 11 of the convection part parallel with the back wall 3 of the combustion chamber have been used to form the cyclone separator. The front wall 1 of the combustion chamber and the wall 11 of the convection part have been bent towards each other and connected with each other to form a cylindrical upper part 16 of the separator. The back wall 3 of the combustion chamber has been bent towards the front wall to form a ceiling 17 of the combustion chamber and runs then parallelly with the cylindrical part of the front wall so that they form together an inner and outer wall 19, 20 of the gas inlet channel 18 of the separator.

Using the back wall 3 of the combustion chamber and the wall 11 of the convection part two opposite walls 22, 23 of return channels 21 have been formed that connect the separator to the lower part of the combustion chamber.

Partition walls 26 divide the separator into parallelly functioning coaxial units 24 and 25. Each unit has been provided with a guide 27 the inner surface 28 of which forms with the inner surfaces 29 and 30 of the cylindrical upper part of the back wall 3 of the combustion chamber and the wall 11 of the convection part parallel turbulence chambers 31 and 32. The partition walls 26 with openings 33 form end walls of turbulence chambers and side walls of return channels. Each turbulence chamber has been connected to its own return channel. Passages 34 between the turbulence chambers open into the convection part.

Tubes 35 of the front wall of the combustion chamber, tubes 36 of the wall 11 of the convection part and tubes 37 of the opposite wall 13 have been connected to a collector tube 38 and tubes 39 of the back wall of the combustion chamber have been connected to a collector tube 40.

When leaving the combustion chamber the flue gases containing solids are lead to turbulence chambers 31, 32 of the parallel separation units through a gas inlet channel 18 that is tangentially connected to the turbulence chamber.

The solids concentrated on the outer periphery of the turbulence chambers are discharged from the turbulence chamber through openings 41 and 42 formed between the guide 27 and the walls 3 and 11 and returned to the combustion chamber through return channels 21. The purified gases flow through the openings 33 in the end walls of the turbulence chambers and through channels 34 formed between these to the convection part 10.

The invention is not limited to the above embodiment but it can be modified and applied within the inventive concept defined by the claims.

I claim:

1. Apparatus for separating solids from flue gases produced in the combustion chamber of a circulating fluidized bed reactor comprising: a horizontal cyclone separator comprising a plurality of coaxially aligned turbulence chambers located above the combustion chamber, a gas inlet channel extending from an upper part of the combustion chamber to an upper part of the cyclone separator, a plurality of return channels for returning solids from said cyclone separator to the combustion chamber, and a plurality of gas outlet channels from the separator to a convection part of the reactor, said gas outlet channels located between said coaxially aligned turbulence chambers.

2. The apparatus according to claim 1 wherein the turbulence chambers have a common gas inlet channel.

3. The apparatus according to claim 1 further comprising gas outlet openings in opposite end walls of the coaxial turbulence chambers connecting said turbulence chambers to said gas outlet channels.

4. The apparatus according to claim 1, 2 or 3 wherein each turbulence chamber is connected to its own return channel for solids.

5. The apparatus according to claim 2 further comprising a gas outlet in the opposite end walls of the parallel turbulence channels.

6. The apparatus according to claim 2 wherein each turbulence chamber is connected to its own return channel for solids.

7. The apparatus according to claim 3 wherein each turbulence chamber is connected to its own return channel for solids.

* * * * *